(12) United States Patent
Dowling et al.

(10) Patent No.: US 12,057,141 B2
(45) Date of Patent: Aug. 6, 2024

(54) VIDEO EDITING SYSTEM, METHOD AND USER INTERFACE

(71) Applicant: Blackmagic Design Pty Ltd, Port Melbourne (AU)

(72) Inventors: Matthew Dowling, Port Melbourne (AU); Alexander Diaz, Port Melbourne (AU)

(73) Assignee: Blackmagic Design Pty Ltd, South Melbourne (AU)

( * ) Notice: Subject to any disclaimer, the term of this patent is extended or adjusted under 35 U.S.C. 154(b) by 0 days.

(21) Appl. No.: 17/632,163

(22) PCT Filed: Aug. 3, 2020

(86) PCT No.: PCT/AU2020/050795
§ 371 (c)(1),
(2) Date: Feb. 1, 2022

(87) PCT Pub. No.: WO2021/022324
PCT Pub. Date: Feb. 11, 2021

(65) Prior Publication Data
US 2022/0284926 A1 Sep. 8, 2022

(30) Foreign Application Priority Data
Aug. 2, 2019 (AU) .............. 2019902773

(51) Int. Cl.
*G11B 27/031* (2006.01)
*G11B 27/34* (2006.01)
(52) U.S. Cl.
CPC ........... *G11B 27/031* (2013.01); *G11B 27/34* (2013.01)

(58) Field of Classification Search
CPC .. H04N 5/265; H04N 21/21805; G06V 20/48; G11B 27/036; G06F 3/048
See application file for complete search history.

(56) References Cited

U.S. PATENT DOCUMENTS

| | | | |
|---|---|---|---|
| 5,519,828 A | 5/1996 | Rayner | |
| 7,805,678 B1 | 9/2010 | Niles et al. | |
| 8,126,312 B2 | 2/2012 | Bushell et al. | |
| 8,156,176 B2 | 4/2012 | Lerman et al. | |
| 8,363,055 B1 | 1/2013 | Gregory et al. | |
| 8,621,355 B2 * | 12/2013 | Eppolito ............. | G11B 27/34 715/723 |

(Continued)

FOREIGN PATENT DOCUMENTS

| | | |
|---|---|---|
| WO | 2007/082167 A2 | 7/2007 |
| WO | 2020/198793 A1 | 10/2020 |

OTHER PUBLICATIONS

Final Cut Pro 7 User Guide ("Final Cut Pro 7", 2010, https://prohelp.apple.com/finalcutpro_help-r01/English/en/finalcutpro/usermanual/index.html#chapter=7%26section=1, pp. 1-11) (Year: 2010).*

(Continued)

*Primary Examiner* — Ryan F Pitaro
(74) *Attorney, Agent, or Firm* — Seed IP Law Group LLP (57) ABSTRACT

A video editing system includes an import manager for importing media files into the video editing system; a user interface; and a synchronization engine for detecting imported media files having one or more common attributes and causing a display in the user interface of an indicia for each detected media file.

19 Claims, 12 Drawing Sheets

(56) References Cited

U.S. PATENT DOCUMENTS

| | | |
|---|---|---|
| 8,819,557 B2 | 8/2014 | Matsuda et al. |
| 8,966,367 B2 | 2/2015 | Meaney et al. |
| 9,996,615 B2* | 6/2018 | Silvestri ............... H04L 65/612 |
| 10,372,306 B2* | 8/2019 | Pendergast ............ G11B 27/34 |
| 10,692,536 B1* | 6/2020 | Johnson ................ G11B 27/34 |
| 2001/0040592 A1 | 11/2001 | Foreman et al. |
| 2002/0172498 A1 | 11/2002 | Esenyan et al. |
| 2003/0142124 A1 | 7/2003 | Takata et al. |
| 2004/0071441 A1 | 4/2004 | Foreman et al. |
| 2006/0224940 A1 | 10/2006 | Lee |
| 2007/0162857 A1 | 7/2007 | Weber et al. |
| 2008/0253735 A1 | 10/2008 | Kuspa et al. |
| 2009/0006368 A1* | 1/2009 | Mei ................... H04N 21/4667 707/999.005 |
| 2009/0087161 A1* | 4/2009 | Roberts ................ H04N 5/262 386/285 |
| 2010/0281372 A1 | 11/2010 | Lyons et al. |
| 2010/0281384 A1 | 11/2010 | Lyons et al. |
| 2012/0198317 A1 | 8/2012 | Eppolito et al. |
| 2012/0206653 A1 | 8/2012 | Graves et al. |
| 2012/0210219 A1 | 8/2012 | Agnoli et al. |
| 2012/0210221 A1 | 8/2012 | Khan et al. |
| 2013/0073964 A1 | 3/2013 | Meaney et al. |
| 2013/0104042 A1 | 4/2013 | Meaney et al. |
| 2013/0121668 A1* | 5/2013 | Meaney ................ H04N 5/262 386/282 |
| 2013/0125000 A1* | 5/2013 | Fleischhauer ...... H04N 21/2743 715/723 |
| 2014/0115477 A1* | 4/2014 | Pendergast .......... G06F 3/04842 715/723 |
| 2014/0143671 A1 | 5/2014 | Kovalick |
| 2015/0121437 A1* | 4/2015 | Tan ................... H04N 21/2187 725/93 |
| 2015/0243325 A1 | 8/2015 | Pacurariu et al. |
| 2016/0225405 A1 | 8/2016 | Matias et al. |
| 2017/0192621 A1* | 7/2017 | Leem .................. H04N 23/631 |
| 2017/0244959 A1* | 8/2017 | Ranjeet .................. G06T 7/292 |
| 2018/0255332 A1* | 9/2018 | Heusser ................ H04H 20/18 |
| 2018/0336931 A1 | 11/2018 | Tandon et al. |
| 2018/0358049 A1 | 12/2018 | Latulipe et al. |
| 2020/0174649 A1 | 6/2020 | Diu |
| 2021/0065746 A1* | 3/2021 | Sugano ................. G11B 27/031 |
| 2023/0353842 A1* | 11/2023 | Maze ..................... H04N 21/84 |
| 2024/0079032 A1* | 3/2024 | Roberts .............. H04N 7/17336 |

OTHER PUBLICATIONS

U.S. Appl. No. 17/453,733, filed Nov. 5, 2021.
U.S. Appl. No. 17/600,966, filed Oct. 1, 2021.
U.S. Appl. No. 17/600,978, filed Oct. 1, 2021.
Sengstack, J. "Edit sequences in the Premiere Pro Source Monitor into other sequences", Mar. 18, 2013, 6 pages.
Blackmagic Design "Blackmagic Design Announces DaVinci Resolve 16", Apr. 8, 2019, 2 pages.
Extended European Search Report for EP Application No. 20781753.7 dated Nov. 25, 2022, 10 pages.
Blackmagicdesign Reference Manual "DaVinci Resolve 14.3", Jan. 2018, 1346 pgs.
Blackmagicdesign Reference Manual "DaVinci Resolve 15", Aug. 2018, 2632 pgs.
Saccone, P. et al., Blackmagicdesign "The Definitive Guide to Davinci Resolve 15" 2019, 407 pgs.
Blackmagicdesign Reference Manual "DaVinci Resolve", Aug. 2020, 3590 pgs.
Extended European Search Report for EP Application No. 21207315.9, dated Apr. 8, 2022, 10 pgs.
Written Opinion of the International Searching Authority for Application No. PCT/AU2020/050320 dated Jun. 3, 2020, 4 pgs.
International Search Report for Application No. PCT/AU2020/050320 dated Jun. 3, 2020, 4 pgs.
Written Opinion of the International Searching Authority for Application No. PCT/AU2020/050322 dated Jun. 9, 2020, 7 pgs.
International Search Report for Application No. PCT/AU2020/050322 dated Jun. 9, 2020, 8 pgs.
International Search Report for Application No. PCT/AU2020/050795 dated Oct. 12, 2020, 7 pgs.
Written Opinion for International Search Report for Application No. PCT/AU2020/050795 dated Oct. 12, 2020, 4 pgs.
Extended European Search Report for EP Application No. 20850686.5 dated Jun. 21, 2023, 12 pages.
First Chinese Office Action for CN Application No. 202080035245.1 dated May 23, 2023, 9 pages.

* cited by examiner

VIDEO EDITING SYSTEM, METHOD AND USER INTERFACE

BACKGROUND

Technical Field

The present disclosure relates generally to video editing software applications. The present disclosure relates particularly, but not exclusively, to a video editing system, method, and user interface that manages video files of a single scene that has been recorded by multiple cameras from different angles.

Description of the Related Art

Film and/or video productions are created on video editing systems typically by assembling the project from a collection of constituent elements. Video editing systems allow these constituent elements—which include video clips, audiovisual clips, audio clips and associated metadata—to be separately imported and edited before being merged into a final production. In some cases, the separate video clips arise from using multiple different cameras to record the same scene from different angles.

Current video editing systems provide functionality to manage such multi-camera source material. For example, the DaVinci Resolve® software provided by the assignee of the present application allows the user to manually select the various clips that comprise the multi-camera scene and create a "multicam" file therefrom. The DaVinci Resolve® software utilizes each clip's audio track to synchronize the separate clips within the multicam file during editing operations.

It would be advantageous to provide an alternative means for managing multi-camera source material.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

BRIEF SUMMARY

According to a first aspect of the present disclosure, there is provided a video editing system including:
- an import manager for importing media files into the video editing system;
- a user interface; and
- a synchronization engine for detecting imported media files having one or more common attributes and causing a display in the user interface of an indicia for each detected media file.

The present disclosure, at least in preferred embodiments, provides a synchronization engine that is integrated with a video editing system, and automatically detects files having common attributes (such as the individual files of multi-camera source material) and conveniently displays details thereof in the video editing system's user interface.

The common attribute may be derived from the imported file itself or from the file's metadata. For example, the common attribute may be timecodes that are common to both files. Alternatively, the common attribute may comprise the time and date of the media files (either alone or in combination with the common timecodes), or the files' audio track (in common with either of the timecodes and time/date). The synchronization engine may be configured to detect additional common attributes. For example, geographical location can be detected and combined with other detected common attributes such as timecode and/or date and time.

The synchronization engine may also detect a non-common attribute of two files and combine this with one or more detected common attributes of the files. For example, two files that contain video recorded by different cameras (such information derived from the files' respective metadata) but with overlapping timecodes and/or dates and times, are likely to comprise multi-camera source material.

Preferably, the user interface includes a timeline and a spatially separate media bin display area, the indicia being displayed in the media bin display area. Optimally, the indicia are displayed in the media bin display area in a manner that indicates that they share a common attribute. According to at least one embodiment, the indicia are vertically distributed in the media bin display area to indicate that the detected media files comprise a multi-camera media clip Preferably, the synchronization engine is capable of detecting the loading of one detected media file into an editing control of the user interface and automatically causing a display of indicia in the user interface of other detected media files having the common attribute. In this regard, the editing control may be a timeline.

Preferably, the synchronization engine is capable of locating a detected media file at a correct position in a timeline relative to another detected media file already present in the timeline and having the common attribute.

According to preferred embodiments, the synchronization engine executes continuously in the background of the video editing system.

According to a second aspect of the present disclosure, there is provide a method for managing media files in a video editing system, the method including the steps of:
- importing media files into the video editing system;
- detecting imported media files having one or more common attributes; and
- displaying an indicia of the detected media files in a user interface of the video editing system.

According to another aspect of the present disclosure, there is provided a software product including a computer readable medium storing instructions which, when executed by a processor, provide the video editing system according to the first aspect of the disclosure or perform the method according to the second aspect of the disclosure.

According to a further aspect of the present disclosure, there is provided a user interface for a video editing system, including:
- an editing control;
- a panel for displaying indicia of a plurality of media files imported into the video editing system; and
- a synchronization engine configured to detect the loading of one of the media files into the editing control and automatically display in the panel indicia of other media files sharing a common attribute with the media file.

As used herein, except where the context requires otherwise, the term "comprise" and variations of the term, such as "comprising," "comprises" and "comprised," are not intended to exclude further additives, components, integers, or steps.

BRIEF DESCRIPTION OF THE DRAWINGS

Further aspects of the present disclosure and further embodiments of the aspects described in the preceding paragraphs will become apparent from the following description, given by way of example and with reference to the accompanying drawings, in which.

DETAILED DESCRIPTION

Figure 1:
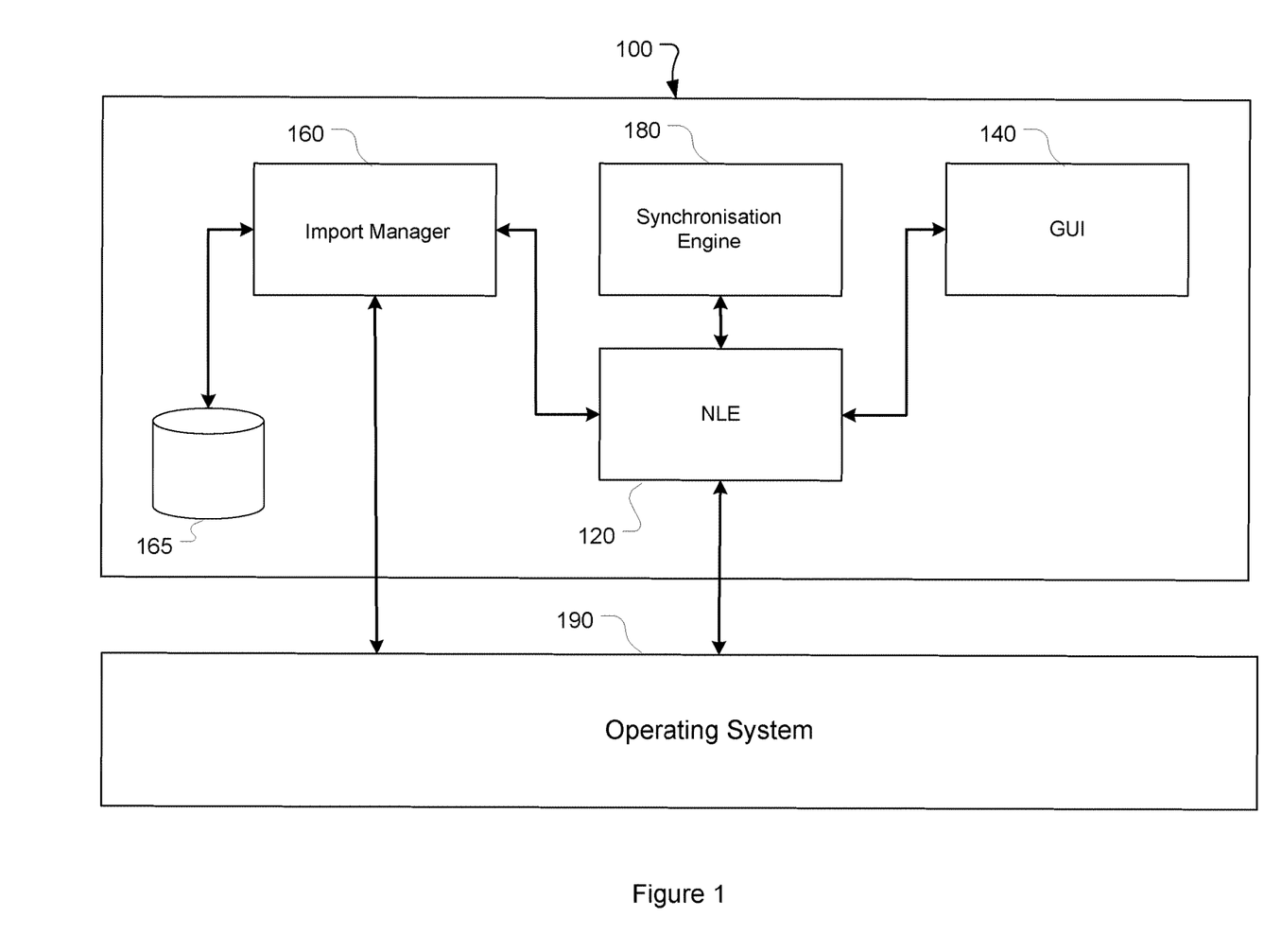
FIG. 1 is a schematic illustration of an integrated collection of software modules that are suitable for implementing an embodiment of the present disclosure.

FIG. 1 illustrates a video editing system 100 that is suitable for implementing embodiments of the present disclosure. Video editing system 100 is a software application installed on a computer system (described below) upon which an operating system 190 is also installed. Video editing system 100 includes a non-linear editor 120, providing functionality that allows for the non-destructive editing of source material (such as video and audio clips) and the creation of finished projects therefrom. When required, non-linear editor 120 utilizes the computer's hardware resources (including video and graphics resources) in order to provide editing and project-creation functionality. Hardware resources are typically accessed through suitable operating system 190 application programming interfaces (APIs).

Video editing system 100 includes a graphical user interface 140 that displays user interface controls for workflows such as video editing, color correction, and project-creation.

Source material is imported into video editing system 100 through an import manager 160. In this regard, import manager 160 accesses suitable operating system 190 APIs to scan local and remote file systems for suitable source material to import into the video editing system 100. Import manager 160 also manages any pre-processing of the source material (such as transcoding) that is required before it can be imported into video editing system 100. Once imported, pertinent details of the source material, such as the filename, directory location, length, hardware details, geographical location, time-and-date, and codec, are stored in a database 165. Database 165 is also used by video editing system 100 to store and access details of projects that are created from the imported source material.

Video editing system 100 further includes a synchronization engine 180. As described below, synchronization engine 180 implements a 'live' synching view that automatically identifies imported media clips that share a common attribute with a selected imported clip and displays those clips in the user interface. According to at least one embodiment, the video editing system 100 automatically creates a folder (or 'media bin') for the multiple media clips sharing the common attribute and displays the media clips in that folder.

For example, the selected media clip could be in the process of being viewed or edited, in which case the synchronization engine 180 displays all other media clips that share a common attribute with the selected media clip. This kind of 'live' view of related (i.e., sharing a common attribute) media clips conveniently shows what clips are available at a particular point in time, and for how long those related clips are available. The live view also allows the related media clips to be quickly accessed and edited.

Figure 2:
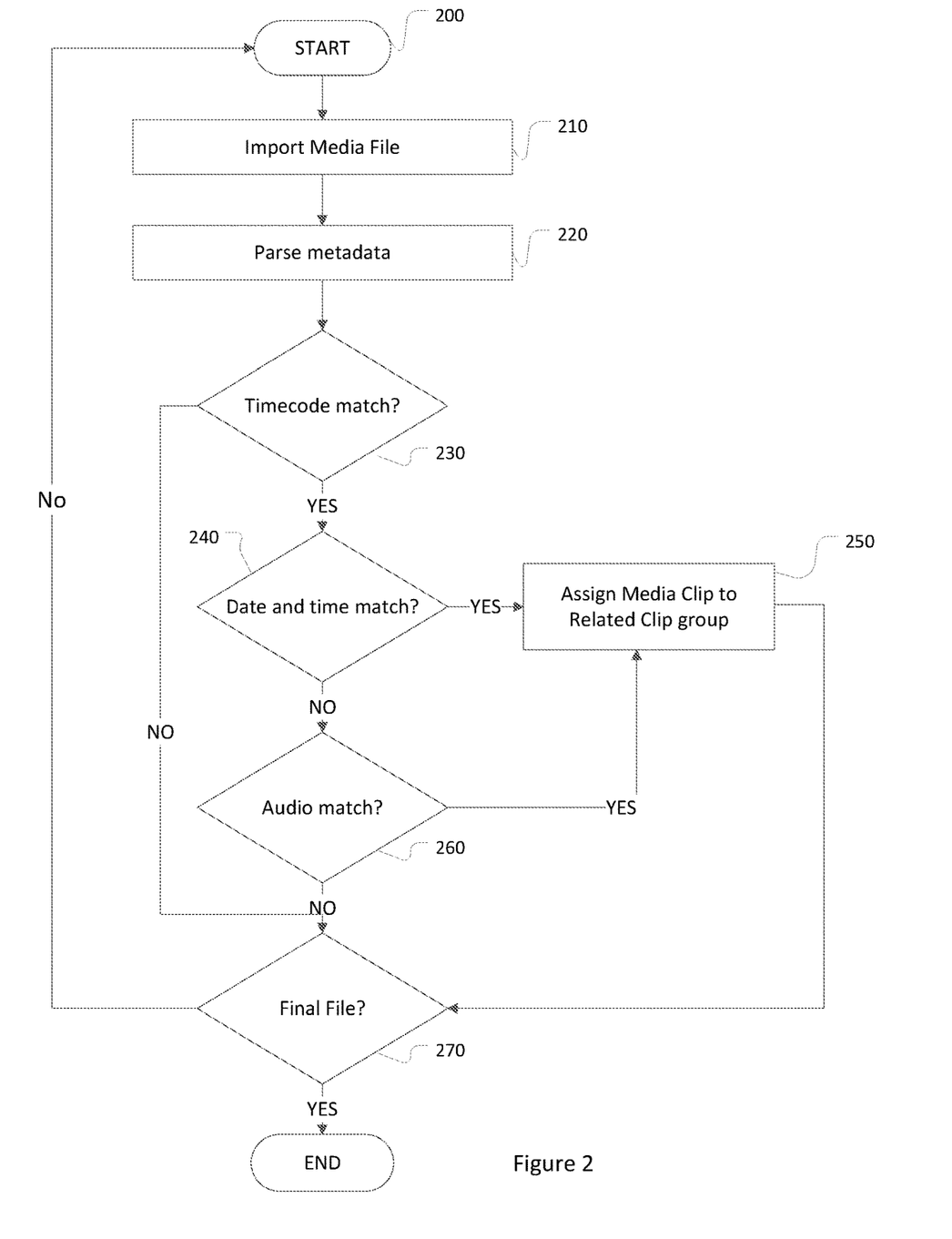
FIG. 2 is a flow chart illustration of an exemplary algorithm executed by the synchronization engine illustrated in FIG. 1.

An exemplary algorithm executed by synchronization engine 180 to provide the live synching view will now be described by reference to FIG. 2. In preferred embodiments, the algorithm is executed continuously in the background of video editing system 100. It is also preferred that the algorithm effects synchronization at a 'source level,' or in other words, utilizes the native file format as delivered from the camera without, or substantially without, manipulation. This potentially delivers a more accurate and efficient synchronization, as well as ensures that imported media is synchronized at the time of first importation and is thus available to the user when it comes time to edit. Source-level synchronization also allows a wide range of detected synchronization information to be used in subsequent projects that utilize the same source media.

The process commences at step 200. At step 210, a media file is imported into video editing system 100. Import manager 160 provides suitable user interface controls for importation. For example, import manager 160 provides a control that allow files to be dragged and dropped from their location in the computer's file system into a project paradigm provided by video editing system 100. For example, video editing system 100 may allow the user to create folders (or "bins") in a directory hierarchy (or "media pool"), to which selected media files can be dragged and thus imported into the video editing system.

At step 220, synchronization engine 180 parses the imported media file and its metadata.

At step 230, synchronization engine 180 attempts to match the imported media file's timecode information with the timecodes of other media files previously imported into video editing system 100. As known to those skilled in the art, timecodes are generated by a video camera contemporaneously with video capture and are used to identify precise locations in the captured video. According to the SMPTE standard, timecodes are generated as 32-bit numbers, each representing hour, minute, second, and frame.

Identifying a sequence of common timecode values in two different files, each containing video recorded by a distinct camera (which is apparent from a camera identifier field present in the files' metadata) suggests that the files' underlying video is the same scene filmed by different cameras, potentially from different angles.

In the event that there are no common timecode values between the newly-imported file and the previously-imported files, the method proceeds to step 270 (see below).

In the event that the timecode of the two media files is matched (which may occur if there are overlapping timecode values), the method proceeds to step 240, at which the synchronization engine 180 attempts to match the date and time information present in the imported file's metadata with corresponding metadata of previously imported files. Date and time information is typically included in the video file using the camera's own internal clock. It is necessarily not as precise as timecode data and is thus used as a secondary matching criteria.

In the event that time and date metadata can be matched, it is likely that the two files comprise a multi-camera source as there are overlapping timecodes in video recorded at around the same time and date. In this scenario, a related clip group is created (if necessary) and the newly-imported media file is assigned to the group (step 250). The related clip group contains all of the files that have been detected as sharing the common attribute (such as common timecode values and/or date and time). As described below, the related clip group is used to trigger user interface functionality that automatically displays all of the clips in the group in response to the user interacting with one of the clips.

In the event that time and date metadata cannot be matched, the method proceeds to step 260, at which the synchronization engine performs an audio comparison routine on any audio track present in the newly-imported file and those of the previously-imported files. In the event that the comparison routine indicates commonalities between the two audio files (which is reflective of the fact that the files' underlying video is of the same scene filmed by different cameras), the method returns to step 250, at which the newly-imported media file is assigned to an appropriate related clip group.

Other matching algorithms can be used with the present disclosure. For example, files could be matched solely using timecodes or solely using date/time information. Other algorithms utilize various combinations of matching criteria such as timecode and audio, or date/time and audio. Other matching criteria, such as geographical coordinates or other location information, can also be used.

Figure 3:
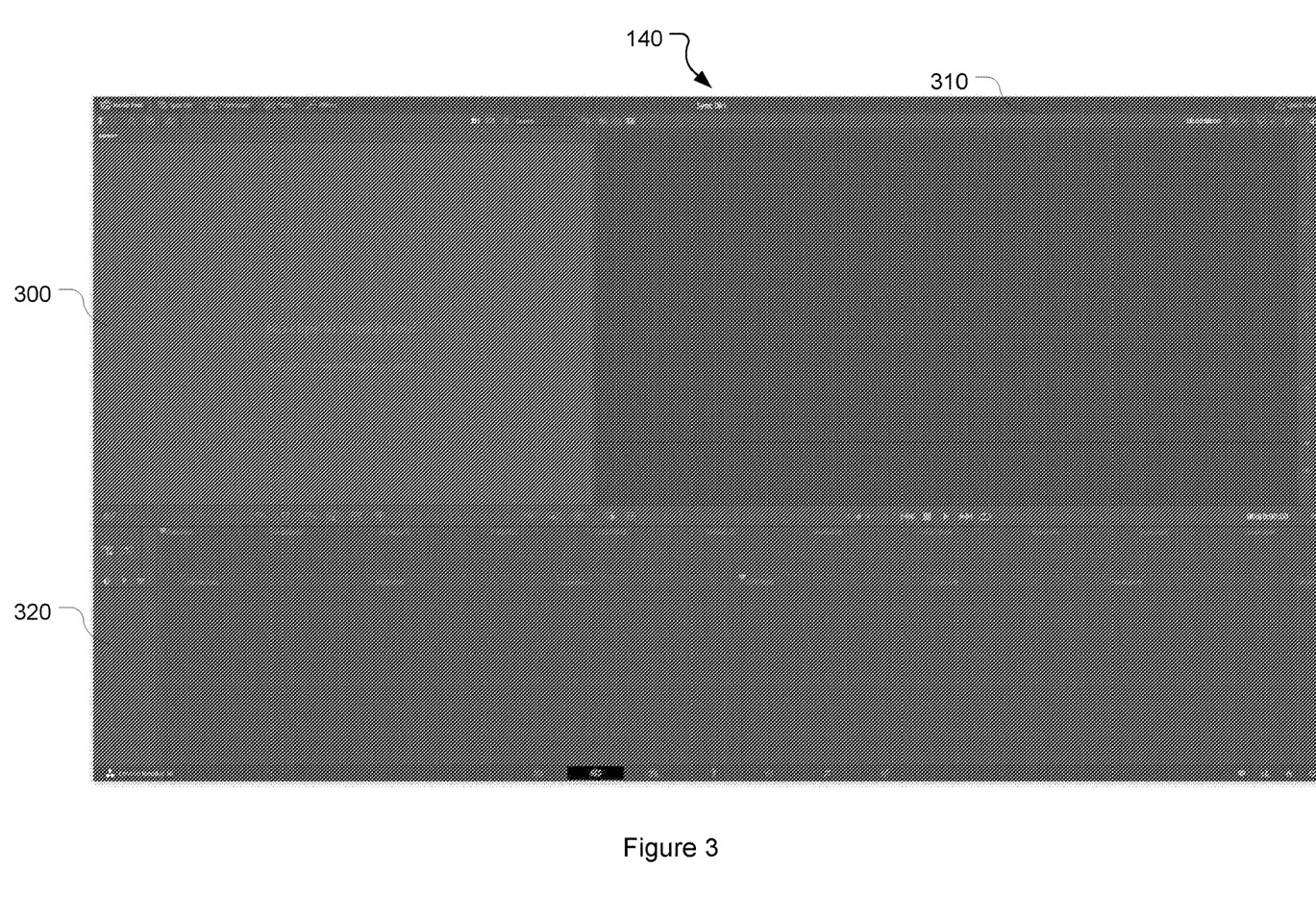
FIGS. 3 to 11 are exemplary graphical user interface displays generated by the video editing system according to an embodiment of the present disclosure.

The DaVinci Resolve® software is an example of a video editing system that is suitable for implementing embodiments of the present disclosure. FIG. 3 illustrates an exemplary user interface 140 generated by the DaVinci Resolve software. Interface 140 includes a panel with a media bin display area 300 for receiving and displaying imported video clips. As no clips have been imported into the project shown in FIG. 3, the media bin display area 300 is empty. Interface 140 also includes a source viewer 310 for viewing a selected video clip and a timeline 320 to which clips can be dragged from the source viewer 310 placed for editing and project creation.

Figure 4:
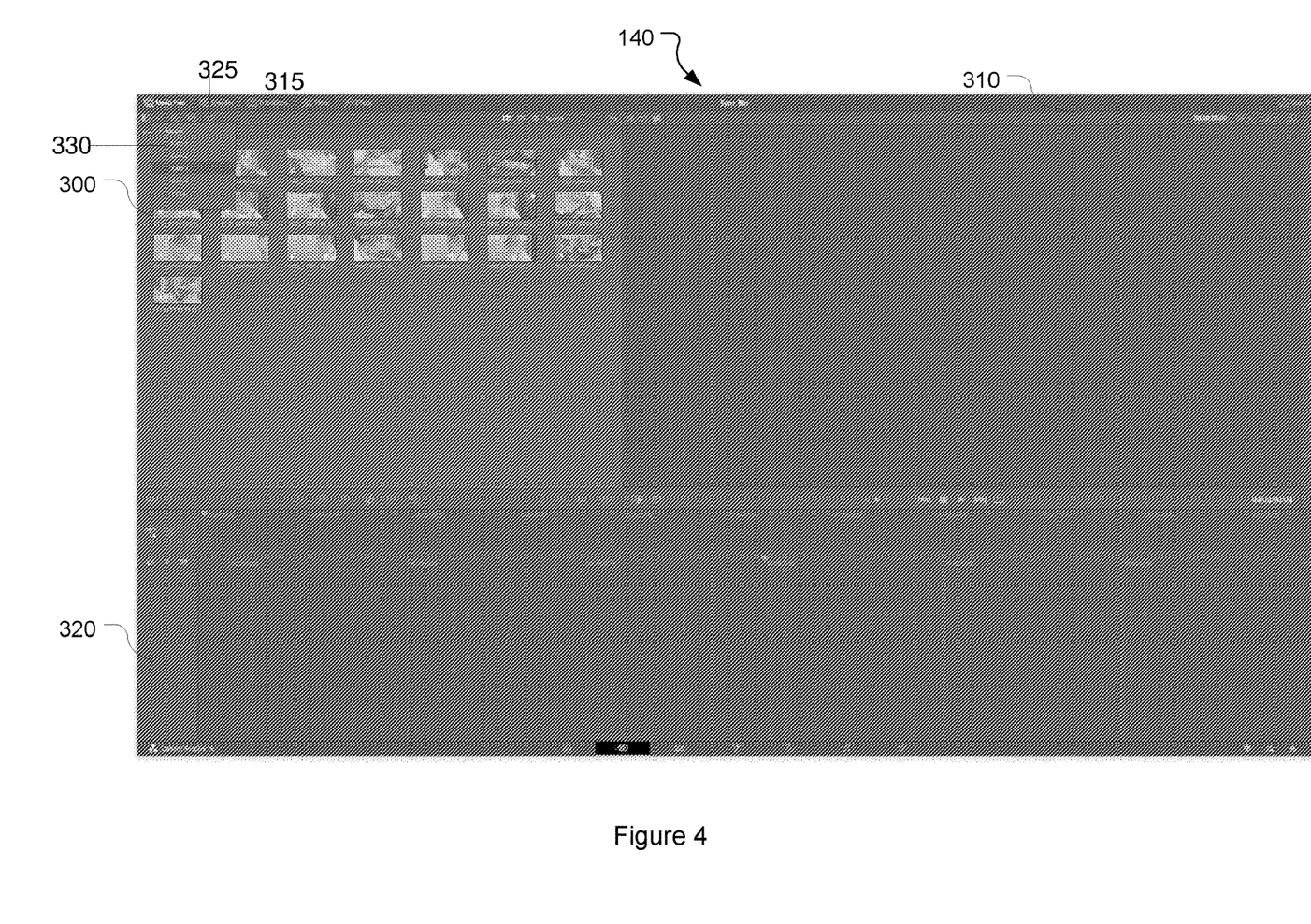

FIG. 4 shows the state of user interface 140 after a series of clips have been imported by placement in media bin display area 300. In the illustrated embodiment, the synchronization engine 180 has performed a live synching on the series of imported clips using the matching algorithm described above. User interface 140 also includes a synch button 325 that, once activated, launches the synchronization engine 180 to perform a synchronization. Activating the synch button 325 displays a synchronization control window that allows the user to select various options pertaining to the synchronization. For example, through the synchronization window, the user can select whether the synchronization is performed on the basis of timecode, time and date, audio or any combination thereof.

In the embodiment illustrated in FIG. 4, the matching algorithm has determined that the imported clips are in respect of a common scene that has been recorded by four different cameras. User interface 140 displays a camera selection window 330 that allows the user to select individual cameras.

Figure 5:
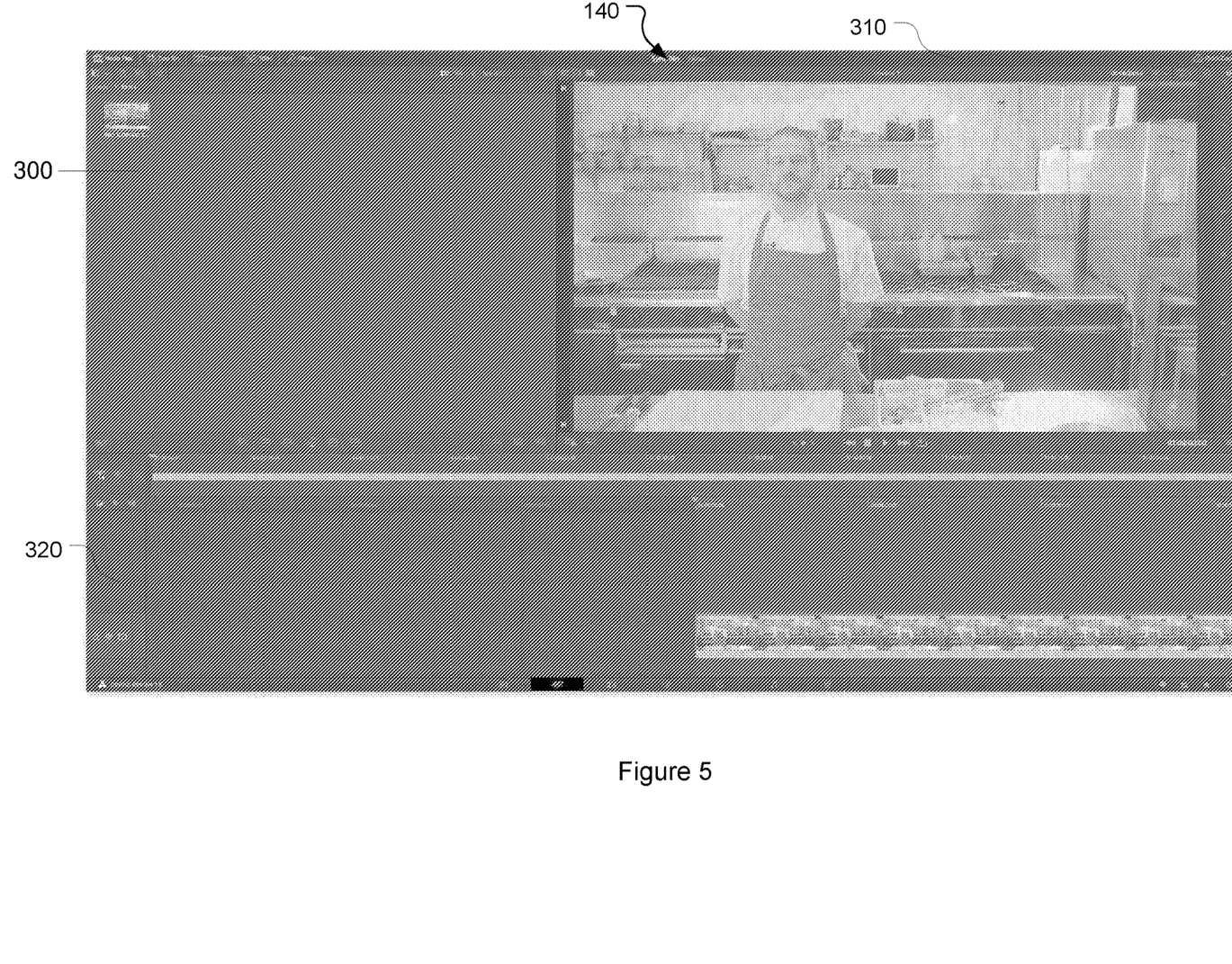

FIG. 5 shows the state of user interface 140 after the user selects "camera 1" from the camera selection window illustrated in FIG. 4. In the illustrated embodiment, only one of the imported video clips was recorded using "camera 1." This is reflected in the single video clip shown in media bin display area 300. The media clip can be selected for viewing in the source viewer 310 and dragged into timeline 320 for editing.

Figure 6:
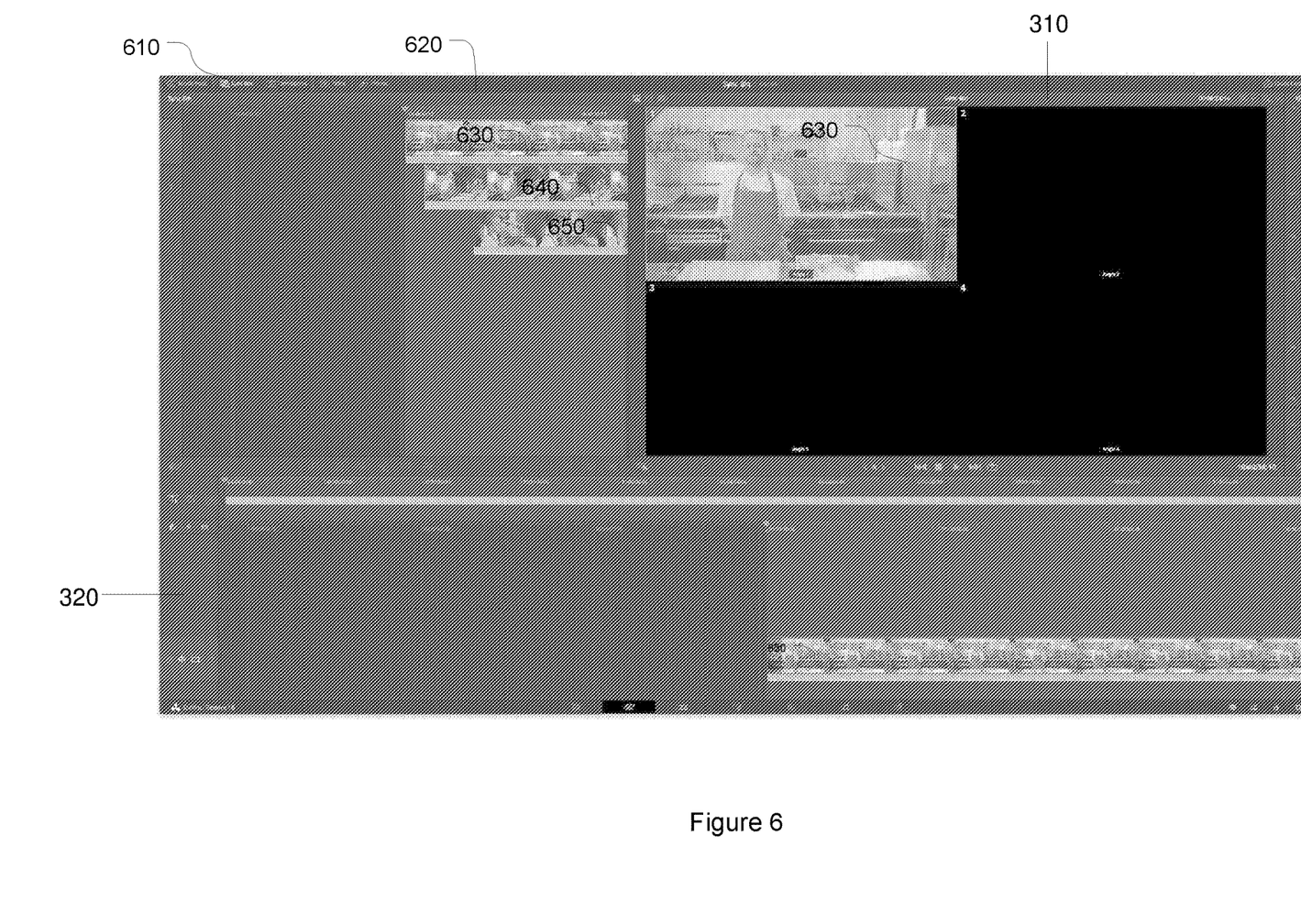

FIG. 6 illustrates the live synching view provided by the present disclosure. The synching view is selected by activating a synchronized-view button 610 labelled as 'Sync Bin' in FIG. 6. Selecting the synchronized-view button 610 causes the NLE 120 to create a new media bin (named 'Synch Bin') and render the contents thereof in a synch bin display area 620. In the illustrated embodiment, an indicium (in the form of a thumbnail) of each clip present in the new media bin is displayed in the synch bin display area.

The clip indicia are displayed in synch bin display area 620 in a manner that indicates that they are synchronized and thus share one or more common attributes. In the illustrated embodiment, the indicia of the clips recorded by the four different cameras (as determined by the matching algorithm) are displayed in a vertically distributed manner in synch bin display area 620.

In the embodiment of the live synching view illustrated in FIG. 6, source viewer 310 includes a separate viewing area for each of the four cameras.

Synch bin display area 620 not only displays the current clip 630 (namely the clip that is present in the timeline 320 and source viewer 310), but also automatically displays any other clips in current clip 630's related clip group. As noted above, in the illustrated embodiment, the related clip group comprises recordings of the same scene by different cameras. These related clips are shown in FIG. 6 as clips 640 and 650. Clips 630, 640 and 650 are distributed vertically in synch bin display area 620 to illustrate their mutually synchronized relationship. As noted above, individual clips are assigned to a relevant clip group by synchronization engine 180, upon the synchronization engine detecting that the clips have common attributes. Display of related clips in a dedicated media bin is completely automatic and transparent to the user.

Related clips 630, 640, 650 are displayed in synch bin display area in accordance with the metadata that was used to detect the common attribute. For example, if clips are detected as having common timecode values, these are used to display the clips in a manner that illustrates the commonality. In the embodiment shown in FIG. 6, clip 630 commences first, which indicates that there was a time interval during which camera 1 was the only camera recording the scene. This is reflected in the source viewer 310 shown in FIG. 6, which only displays clip 630, with the other viewing areas being blank.

At a later point in time, clips 630 and 640 overlap (for example, by having common timecodes or audio tracks), indicating that cameras 1 and 2 were simultaneously and independently recording the same scene. At a yet later point in time, all three clips 630, 640 and 650 overlap, indicating that each of camera 1, camera 2, and camera 3 was recording the same scene. This temporal information is displayed by offsetting the commencement points of clips 640 and 650 relative to clip 630.

The user can drag a clip (in FIG. 6, clip 630) into a timeline 320 for editing and project creation. Non-linear editor (NLE) 120 utilizes the detected attribute information (for example timecode information, time-and-date, or audio track) to locate the clip in the correct temporal location in the timeline. Attribute information is also used to preserve the synchronization of multiple clips when they are dragged into the timeline 320.

Figure 7:
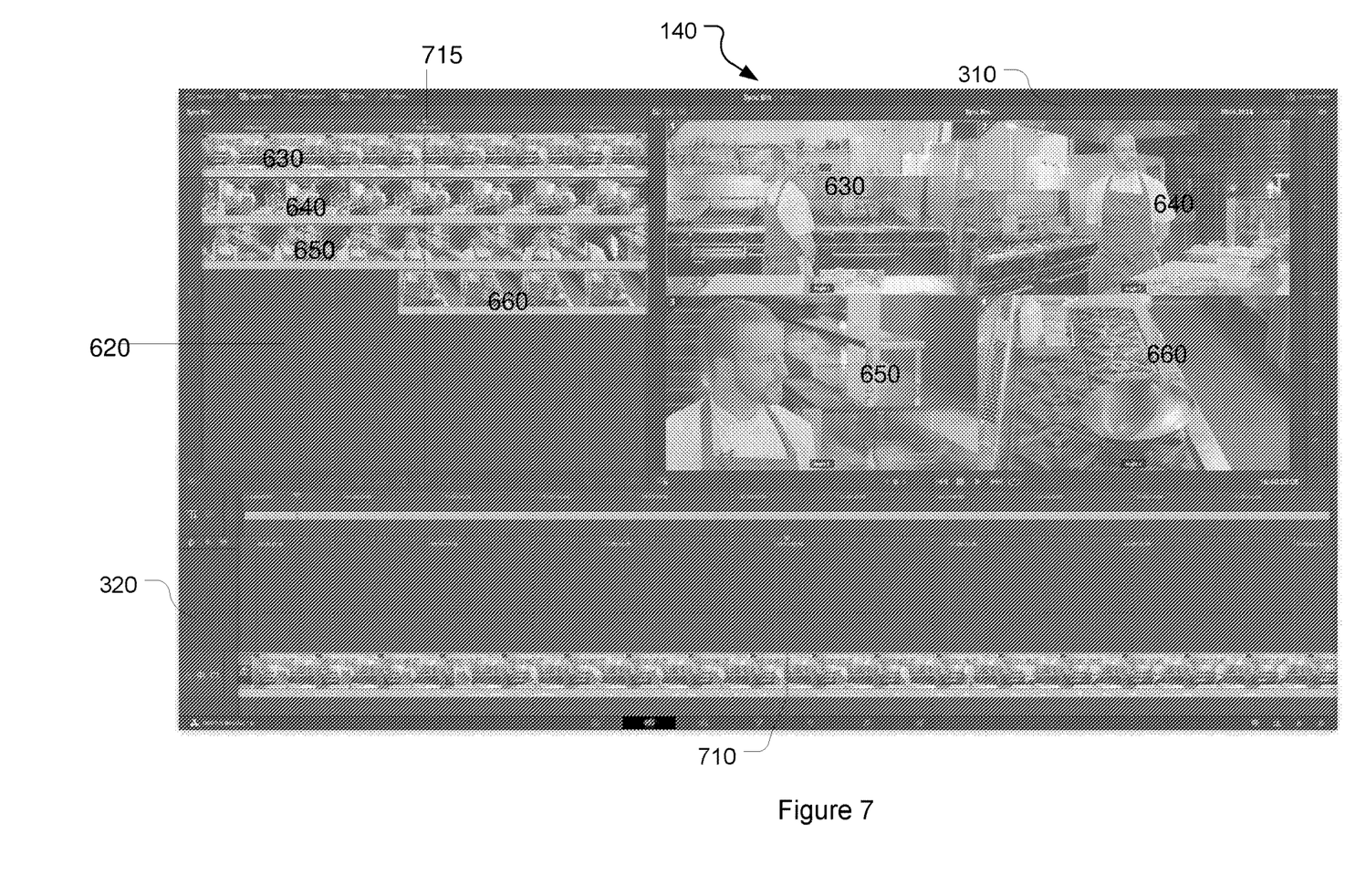

FIG. 7 illustrates the state of user interface 140 after a playhead 710 in timeline 320 has progressed to a later time than shown in FIG. 6. A second playhead 715 is provided in synch bin display area 620, which the user can also manipulate to scroll through the displayed clips.

At the time shown in FIG. 7, playheads 710 and 715 have advanced to a position where multiple related clips are being played. In particular, at the temporal position shown in FIG. 7, all four cameras (namely camera 1, camera 2, camera 3, and camera 4) were individually and simultaneously recording the same scene. This is indicated by the vertically distributed display of clips 630, 640, 650, and 660 in synch bin display area 620. The present disclosure detects such a scenario and automatically loads all related clips into the relevant viewing areas of source viewer 310.

Figure 8:
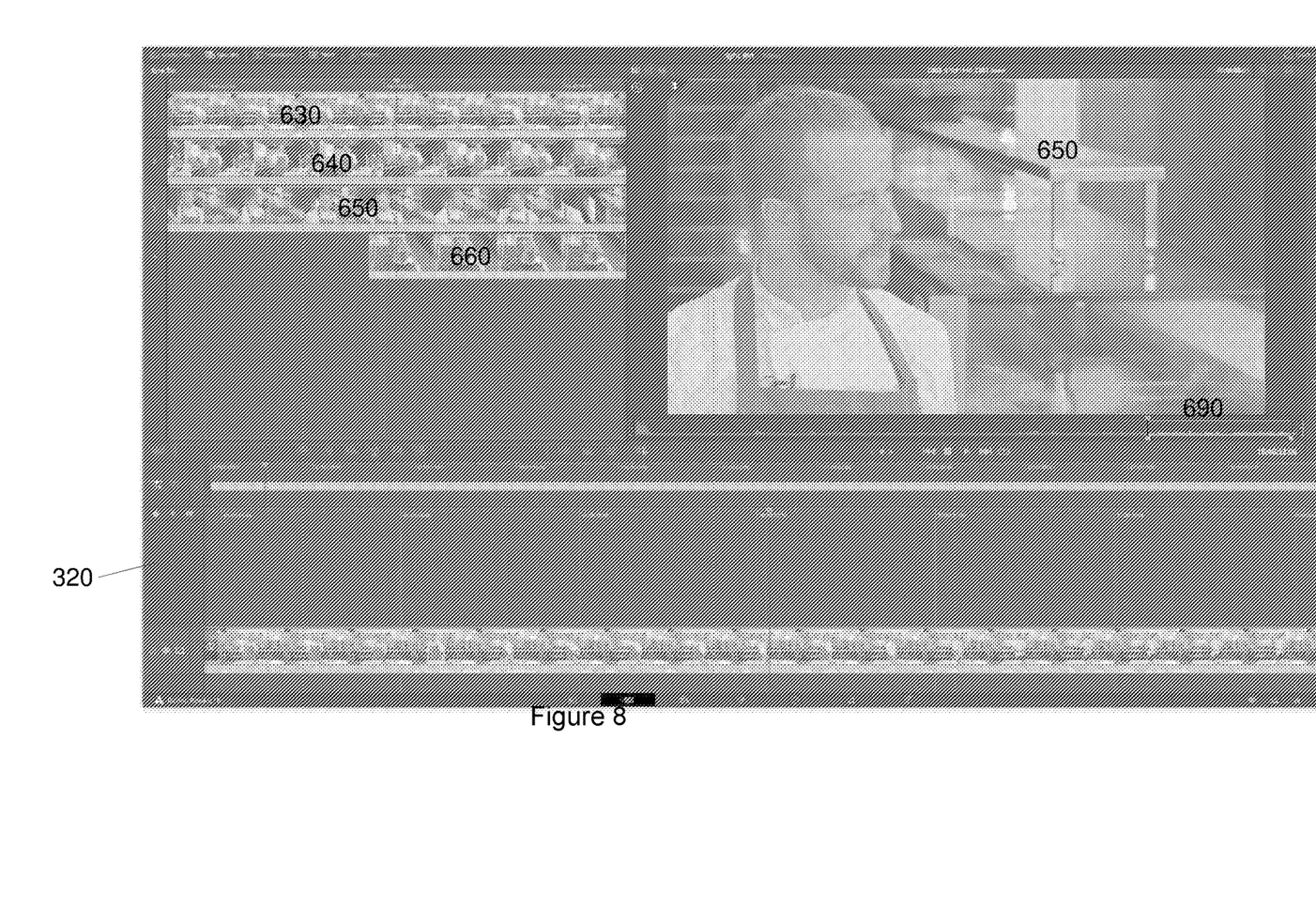

As shown in FIG. 8, any one of the individual views can be conveniently selected for viewing in source viewer 310. An audio waveform viewer 690 is provided immediately below source viewer 310. Audio waveform viewer 690 functions as an editing control and allows the user, for example, to mark the clip (in this case clip 660) with in and out points. The in and out points define a section of the overall clip than can be loaded into the timeline 320 for editing and project creation. As noted above, NLE 120 utilizes the detected attribute information (for example timecode information) to locate the clip section in the correct temporal location in the timeline 320.

Figure 9:
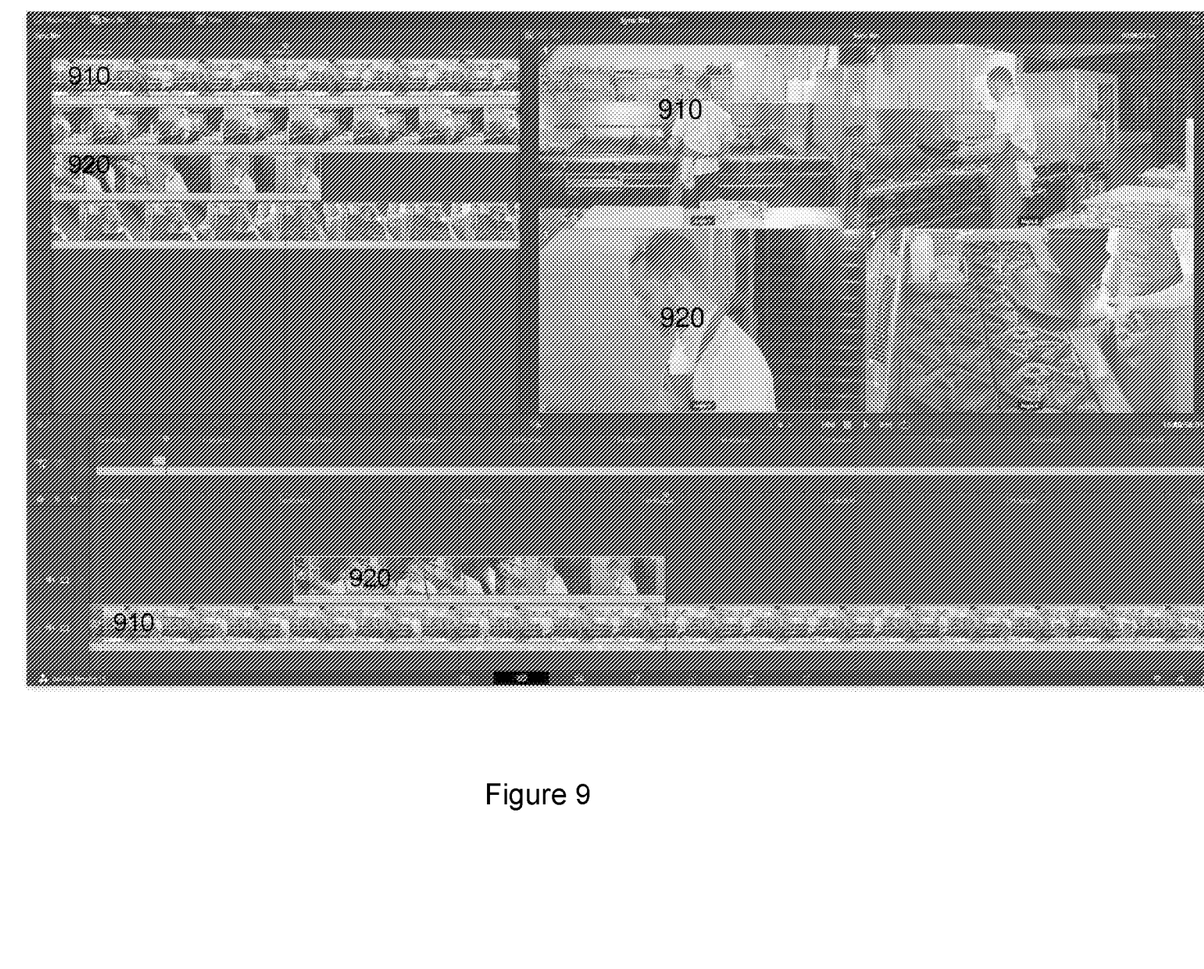

As noted above, once clips are displayed in synch bin display area 620, they can be suitably dragged to timeline 320 and edited in the usual way. This is illustrated in FIG. 9 that shows two related clips 910 and 920 having been dragged from source viewer 310 or synch bin display area into timeline 320. Source viewer 310 is shown as displaying all four of the clips present in synch bin display area 620, although only two of them have been dragged into timeline 320.

Importantly, the synchronized temporal relationship between clips 910 and 920 (as detected by the matching algorithm) is preserved when the clips are dragged into the timeline 320. This allows for camera switches to be seamlessly performed. In other words, when the project cuts from clip 910 to clip 920 and back to clip 910 (as illustrated in FIG. 9), continuity of the overall project is preserved.

Figure 10:
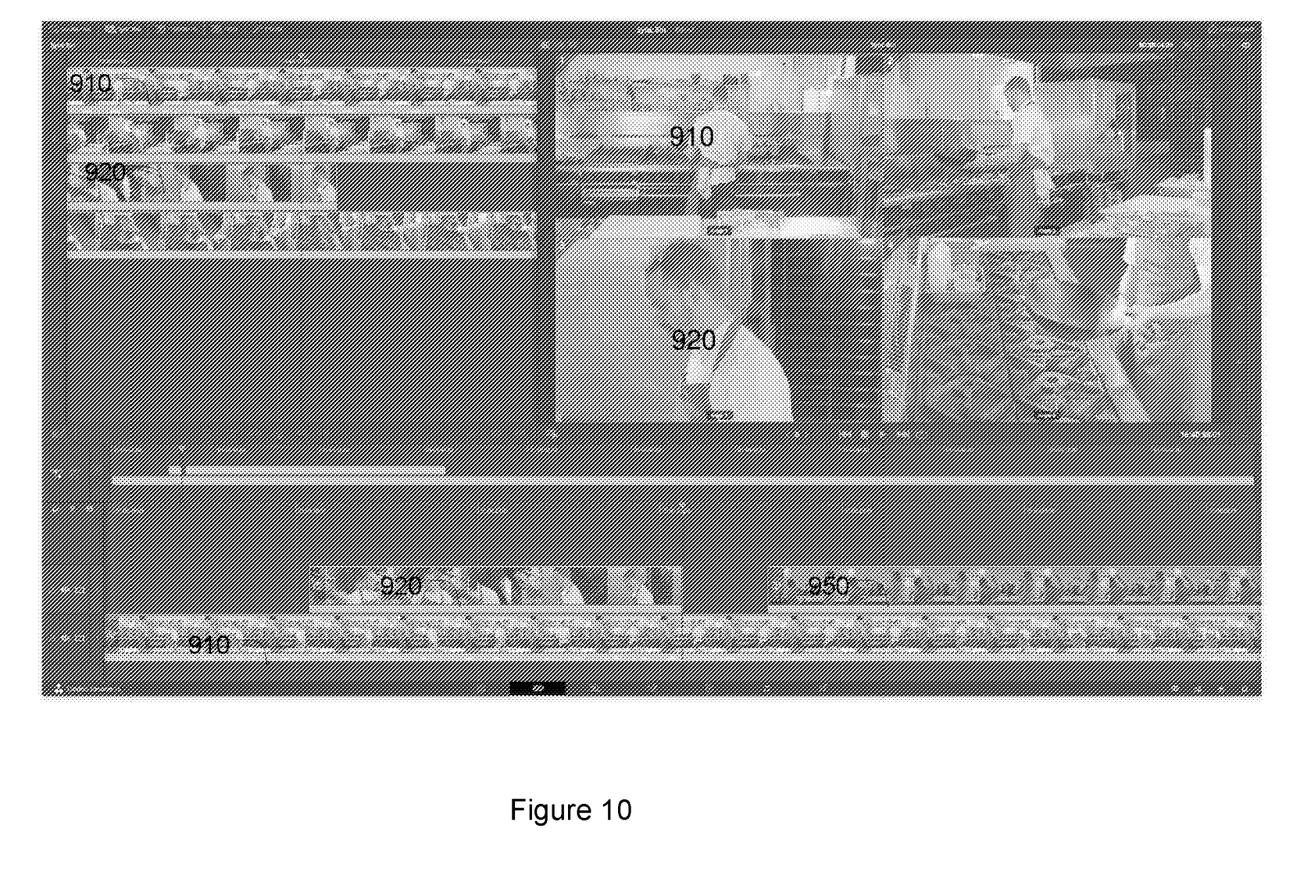

The synchronization engine 180 of the present disclosure operates seamlessly with the other editing features provided by video editing system 100. This is illustrated in FIG. 10, which shows an unrelated clip 950 that has been dragged into the same track of timeline 320 occupied by clip 920. Such editing features are permitted despite clip 950 not being in the same related clip group as clip 920. At the same time, the temporal relationship between clips 910 and 920 is preserved in the timeline 320.

Figure 11:
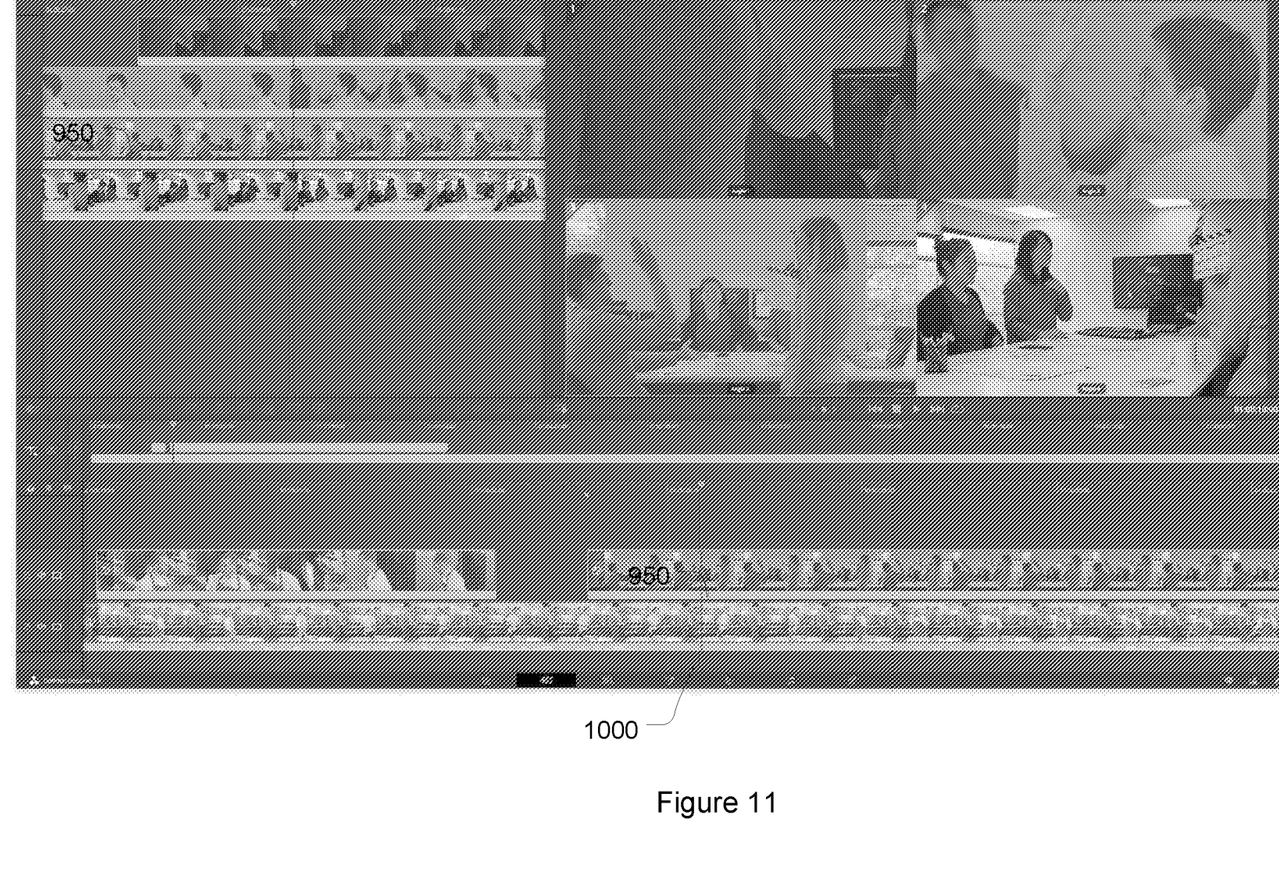

FIG. 11 illustrates the state of the user interface of FIG. 10 after a playhead 1000 has progressed beyond playing clip 920 and has commenced playing clip 950. As noted above, clip 950 is not in the same related clip group 920, as the synchronization engine 180 has not detected any common attributes shared by the clips. However, clip 950 does share common attributes with other clips, those attributes having been previously detected by synchronization engine 180. In this scenario, synchronization engine 180 automatically creates a new synch bin and synch bin display area 620, and loads the clips that are related to clip 920 into the newly created bin. The newly created synch bin display area is displayed when playhead 1000 commences playing clip 950. These loaded clips can then be suitably dragged onto the time line for editing.

Figure 12:
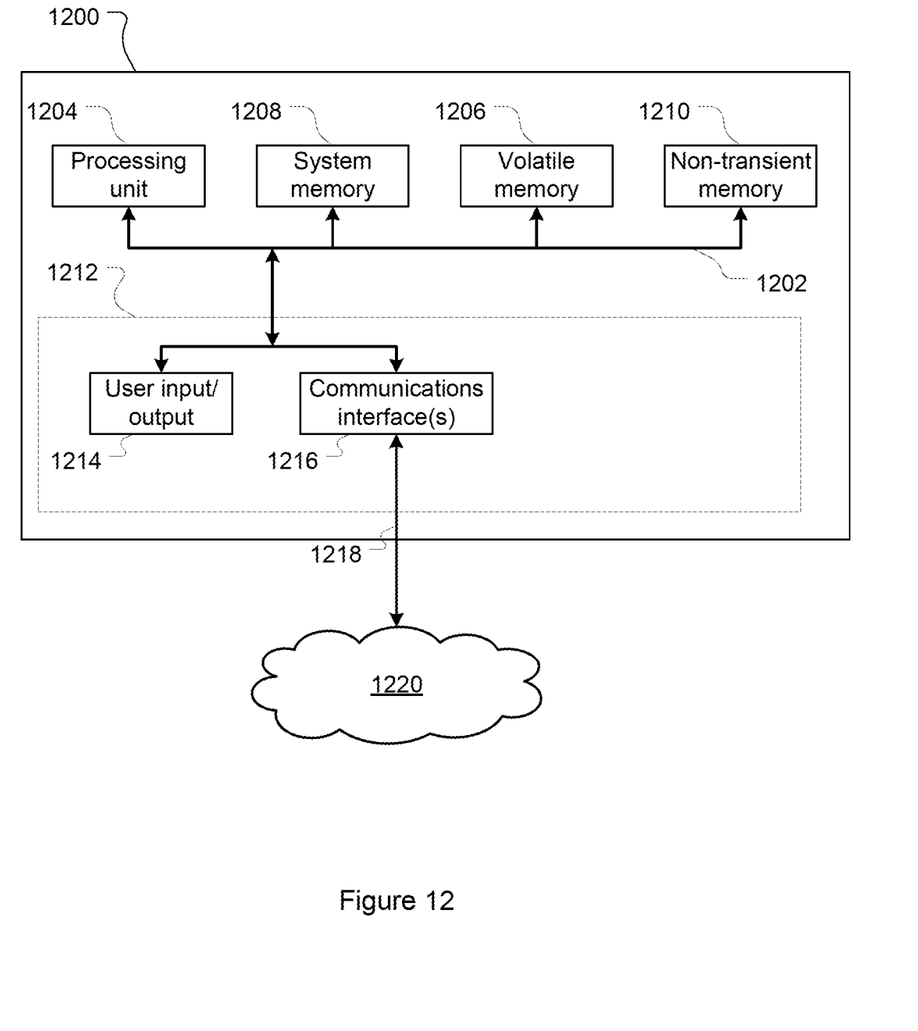
FIG. 12 is a schematic illustration of a hardware environment suitable for implementing the video editing system in accordance with an embodiment of the present disclosure.

FIG. 12 provides a block diagram that illustrates one example of a computer system 1200 upon which embodiments of the disclosure may be implemented. Computer system 1200 includes a bus 1202 or other communication mechanism for communicating information, and a hardware processor 1204 coupled with bus 1202 for processing information. Hardware processor 1204 may be, for example, a general purpose microprocessor, a graphics processing unit, other type of processing unit or combinations thereof.

Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions including the video editing software application described above.

The computer system 1000 may be coupled via bus 1202 to a display 1212 (such as an LCD, LED, touch screen display or other display), for displaying information to a computer user, such as the graphical user interface described and illustrated above. An input device 1214, including alphanumeric and other keys, may be coupled to the bus 1202 for communicating information and command selections to processor 1204. Another type of user input device is a cursor control, such as a mouse, a trackball, or cursor direction keys for communicating direction information and command selections to processor 1204 and for controlling cursor movement on display 1212.

According to at least one embodiment, the techniques herein are performed by computer system 1200 in response to processor 1204 executing one or more sequences of one or more instructions contained in main memory 1206. Such instructions may be read into main memory 1206 from another storage medium, such as a remote database. Execution of the sequences of instructions contained in main memory 1206 causes processor 1204 to perform the process steps described herein. In alternative embodiments, hardwired circuitry may be used in place of or in combination with software instructions.

The terms "storage media" or "storage medium" as used herein refers to any non-transitory media that stores data and/or instructions that cause a machine to operate in a specific fashion. Such storage media may comprise non-volatile media and/or volatile media. Non-volatile media includes, for example, optical or magnetic disks, such as storage device 1210. Volatile media includes dynamic memory, such as main memory 1206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Computer system 1200 also includes a communication interface 1216 coupled to bus 1202. Communication interface 1216 provides a two-way data communication coupling to a network link 1218 that is connected to a communication network 1220. For example, communication interface 1216 may be an integrated services digital network (ISDN) card, cable modem, satellite modem, etc. As another example, communication interface 1216 may be a local area network (LAN) card to provide a data communication connection to a compatible LAN. Wireless links may also be implemented. In any such implementation, communication interface 1216 sends and receives electrical, electromagnetic or optical signals that carry digital data streams representing various types of information.

It will be understood that the disclosure disclosed and defined in this specification extends to all alternative combinations of two or more of the individual features mentioned or evident from the text or drawings. All of these different combinations constitute various alternative aspects of the disclosure.

Thus, changes can be made to the embodiments disclosed herein in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A video editing system, including:
a computer system comprising a computer processor and memory storing instructions executable by the computer processor to cause the computer system to provide:
an import manager for importing media files into the video editing system;
a user interface;
a synchronization engine for detecting imported media files having one or more common attributes; and
a non-linear editor for non-destructive editing of the media files and creation of a project from the edited media files;
wherein:
the user interface includes a timeline and spatially separate media bin display area;
wherein said synchronization engine is configured, upon selection of a media file for viewing or editing, to display a media bin in the media bin display area, the media bin including indicia for each detected media file that shares one or more common attributes with the selected media file; and
the non-linear editor is configured, responsive to a user using the user interface, to load a selected one of the detected media files into said timeline, and, to utilize the one or more common attributes to locate said selected media file at a correct temporal position in said timeline relative to another detected media file having said one or more common attributes that is already present in the timeline.

2. The video editing system according to claim 1, wherein the one or more common attributes include one or more of a timecode, time, date, and an audio waveform.

3. The video editing system according to claim 1, wherein the indicia are displayed in the media bin display area in a manner that indicates that they share a common attribute.

4. The video editing system according to claim 3, wherein the indicia are vertically distributed in the media bin display area, and wherein a relative temporal position of each media file is indicated by a commencement point of each indicium.

5. The video editing system according to claim 1, wherein the user interface includes simultaneous display of a first playhead in the timeline and a second playhead in the media bin display area, wherein the first playhead and the second playhead are user manipulable to scroll through the displayed media files.

6. The video editing system according to claim 1, wherein the synchronization engine executes continuously in the background of the video editing system.

7. The video editing system according to claim 1, wherein the non-linear editor is configured to, enable a user to load an imported media file that is not a said detected media file into the timeline.

8. A method for managing media files in a video editing system, the method including:
importing media files into the video editing system;
detecting imported media files having one or more common attributes;
displaying a user interface of the video editing system, including a media bin display area for displaying media files;
upon selection of a media file for viewing or editing, displaying an indicia of each detected media file sharing one or more common attributes with the selected media file in a media bin in the media bin display area; and
in response to a user loading one of said detected media files into a timeline of said user interface, using said one or more common attributes of said one detected media file to locate said one detected media file at a correct temporal position in the timeline relative to another detected media file already present in the timeline and having the common attribute.

9. The method of claim 8, wherein the user interface of the video editing system includes:
an editing control area in the form of the timeline;
the media bin display area spatially separated from the editing control area for displaying indicia of a plurality of media files imported into the video editing system; and
a synchronization engine configured to detect the loading of one media file of the plurality of media files into the editing control area and automatically display, in the media bin display area, indicia of other media files sharing a common attribute with the one media file.

10. The method of claim 8, wherein in response to a playhead on the timeline commencing playing a media file in the timeline of the user interface, displaying in the media bin display area a media bin containing indicia of one or more detected media files sharing one or more common attributes with the playing media file.

11. The method of claim 8, further including preserving a temporal relationship in the timeline between detected media files sharing one or more common attributes when the timeline additionally includes at least one unrelated media file that does not share the one or more common attributes.

12. The method of claim 8, further including vertically distributing the indicia in the media bin display area for the detected media files and displaying the detected media files in a manner that illustrates a commonality of said one or more common attributes.

13. The method of claim 12, wherein the method includes displaying a first playhead in the timeline and a second playhead in the media bin display area.

14. The method of claim 12 further including indicating a relative temporal position of each media file by a commencement point of each indicium.

15. The method of claim 8, wherein the one or more common attributes include one or more of a timecode, time, date, or an audio waveform.

16. A non-transient storage medium storing information and instructions for a computer processor, including instructions for a video editing software application that, when executed by the computer processor, provides a video editing system, the video editing software application including:

an import manager for importing media files into the video editing system;
a user interface;
a synchronization engine for detecting imported media files having one or more common attributes; and
a non-linear editor for non-destructive editing of the media files and creation of a project from the edited media files;
wherein:
the user interface includes a timeline and a spatially separate media bin display area;
wherein said synchronization engine is configured, upon selection of a media file for viewing or editing, to display a media bin in the media bin display area, the media bin including indicia for each detected media file that shares one or more common attributes with the selected media file; and
the non-linear editor is configured, responsive to a user using the user interface, to, load a selected one of the detected media files into said project timeline and, to utilize the one or more common attributes to locate said selected media file at a correct temporal position in said timeline relative to another detected media file having said one or more common attributes that is already present in the timeline.

17. The non-transient computer storage medium according to claim 16, wherein the synchronization engine executes continuously in the background of the video editing system.

18. The non-transient computer storage medium according to claim 16, wherein the non-linear editor is configured to, enable a user to load an imported media file that is not a said detected media file into said timeline.

19. The non-transient computer storage medium of claim 16, wherein the one or more common attributes include one or more of a timecode, time, date, or an audio waveform.

* * * * *